Patented Oct. 26, 1954

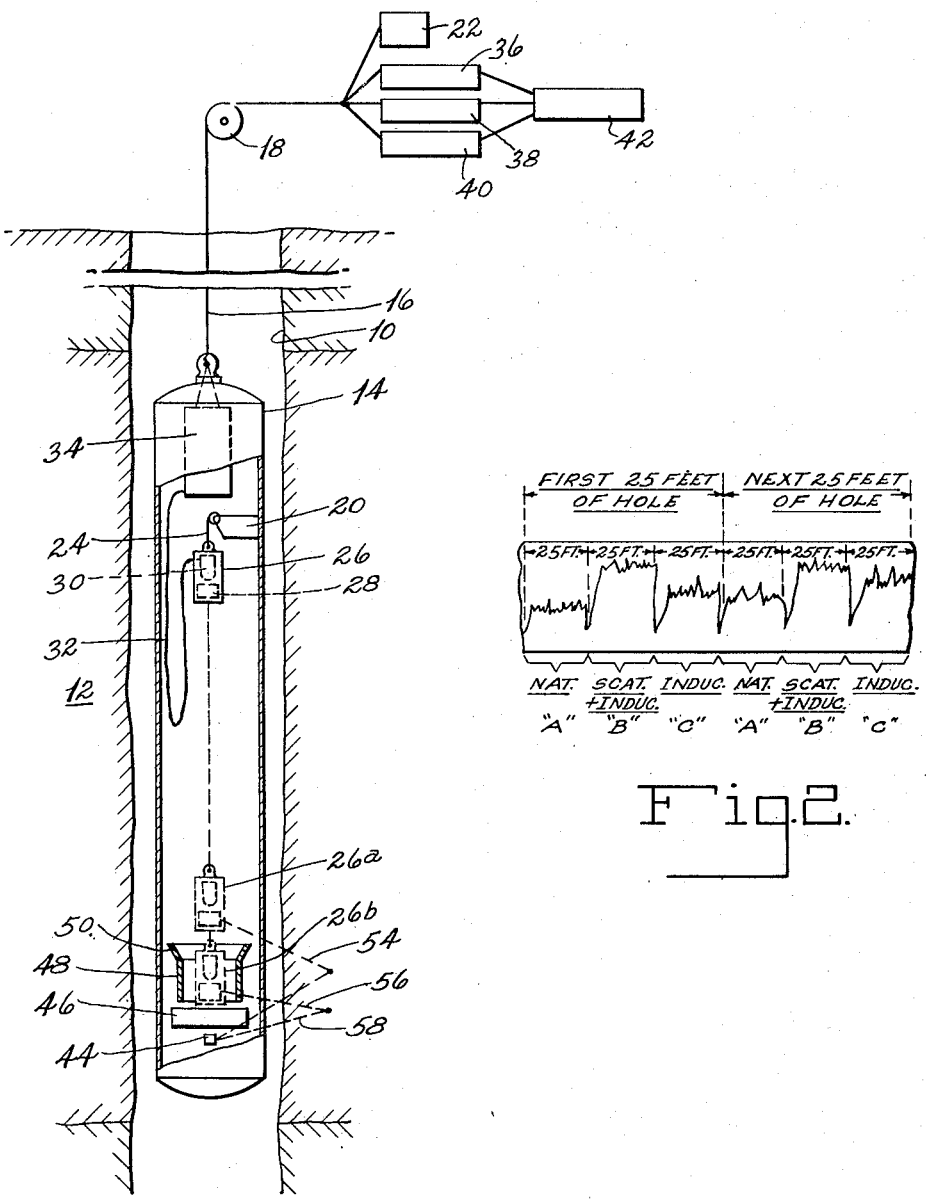

2,692,949

UNITED STATES PATENT OFFICE 2,692,949

COMBINATION RADIOACTIVITY BOREHOLE LOGGING

John D. MacKnight, Mount Vernon, N. Y., assignor to The Texas Company, New York, N. Y., a corporation of Delaware Application December 29, 1951, Serial No. 264,119

13 Claims. (Cl. 250—71)

This invention relates to a method and apparatus for determining the nature of earth formations and more particularly to the logging of the formations traversed by a well or bore hole. Principal object of the invention is the provision of a method and apparatus by means of which at least three different kinds of radioactivity logs can be made with one passage of a logging instrument through the hole and which instrument contains but one source of radioactivity and one detector of penetrative radiation such as gamma rays.

It is now well known that there are several forms or kinds of radioactivity bore hole logs. In perhaps the simplest form, that is, the natural gamma ray log, a gamma ray detector with its associated equipment is passed through the bore hole and a record is made of the gamma rays naturally emitted in the formations traversed by the hole. In another form sometimes referred to as the scattered gamma ray log, a source of gamma rays is passed through the bore hole and a gamma ray detector is also disposed in the instrument housing, this detector responding to or serving to detect gamma rays from the source which are scattered or diffused in the surrounding formations, some of these gamma rays returning to the bore hole to strike the detector. With this type of log information such as the relative densities of the formations can be obtained while with the above mentioned natural gamma ray log information can be had as to the nature of the formations or, as an example, whether they are shales, sands, limestone, etc. In still another form of radioactivity logging, a source of neutrons is passed through the bore hole, the neutrons in penetrating the surrounding formations causing gamma rays to be induced therefrom, some of which gamma rays enter the bore hole to strike a gamma ray detector disposed near the neutron source. This type of log is frequently referred to as an induced gamma ray log or a neutron-gamma log and provides information as to the velocities of the traversed formations.

Until recently the different logs mentioned above have been made with the use of a gamma ray detector of the ionization chamber type or of the electrical-pulse-producing or counter type. These detectors vary from around one to about three inches in diameter and in length from about ten inches to as much as three or four feet. Recently successful bore hole logs had been made using a scintillation detector or "scintillometer" as the means for detecting the radiation reaching the hole from the surrounding formations. For the same efficiency the scintillometer detector is much smaller than the detector of the counter or ionization chamber type and consequently much better definition as of the interfaces between adjacent formations can be obtained than with the use of other detectors. As is well known a typical scintillometer usually comprises a body of luminophor in which scintillations or photons are produced when the body is irradiated by penetrative radiation, together with means for converting the scintillations or photon emissions into electrical pulses corresponding in number to the number of rays penetrating the luminophor. For this latter purpose a photomultiplier tube is frequently used, the cathode of this tube being exposed to the luminophor. Many different types of luminophors can be used but one of the more common types comprises a crystal of sodium iodide, thallium activated.

In the past, if it were desired to make all three of the above mentioned radioactivity logs of a bore hole, it would have been necessary to use several different logging instruments, each instrument containing a gamma ray detector, a preamplifier and perhaps a source of radiation, depending upon the type of log desired and each logging instrument would have to be run separately through the bore hole. Due to the length of a detector of the counter or ionization chamber type it would be practically impossible to include three detectors together with their preamplifiers and shielding and sources of radiation in a single instrument housing of a size which could be conveniently passed through a bore hole.

In accordance with the present invention a well logging instrument is provided which contains but one gamma ray detector, this being of the scintillometer type, one preamplifier and a source of radiation and this instrument is of such form that all three types of logs can be made. Although the three logs are not made exactly simultaneously they can be made in increments or stages with but one passage or round trip of the logging instrument through the bore hole. To accomplish this result the detector is disposed in one end of the logging instrument housing at a distance of about six feet from the source of radiation disposed in the other end of the housing. The housing is then moved through a predetermined distance or section in the hole, for example twenty-five feet, and during this movement the detector responds to the natural gamma rays from the formations and thus, a natural gamma ray log is made. To make the scattered gamma ray log the detector is then moved to a position fairly close to the source of radiation and the housing is again moved back over the same distance or section in the hole during which movement a log will be made of the gamma rays originating in the source which are scattered in the surrounding formations and gamma rays induced in the formations by neutron bombardment from the source. The detector is then lowered a little farther toward the source and in that position it will be surrounded by a scattered gamma ray shield. By again moving the housing over the same path an induced gamma ray log will be made of the bore hole section since the detector will respond to gamma rays induced in the formations by neutron bombardment. As indicated above, when the detector is in the intermediate or second position for making the scattered gamma ray log it may also respond to induced gamma rays and it is preferred that the output of the detector when making the induced gamma ray log be subtracted from the output when making the combination scattered and induced gamma ray log so as to eliminate from the latter log the effect of gamma rays induced by the neutron bombardment of the formations in order to obtain a true scattered gamma ray log. It is also contemplated that the output of the detector when making the natural gamma ray log can be subtracted from the outputs of the detector when making the combination scattered and induced gamma ray log and the true induced gamma ray log so as to eliminate from the latter two logs the effect of the gamma rays naturally emitted in the formations.

For a better understanding of the invention, reference may be made to the accompanying drawing in which:

Fig. 1 is a vertical elevation through a portion of a well or bore hole showing suspended therein an instrument embodying the principles of the invention, and Fig. 2 represents a section of a log strip showing three types of logs recorded thereon.

Referring to the drawing a bore hole 10 is shown as traversing several subsurface formations such as the one indicated at 12. The bore hole 10 can be either cased or uncased since gamma rays entering the hole from the surrounding formations will pass through the conventional steel casing with but very little loss. Shown as suspended within the bore hole is a logging instrument indicated generally by the housing 14, this instrument being suspended on a cable 16 which may be of the electrical conductor type and which at the surface passes over a suitable measuring reel or drum 18 which measures the amount of cable payed out and thus the depth of the instrument 14 in the bore hole. The instrument 14 is formed of an elongated tubular closed shell which serves to house the radiation detector, the preamplifier, source of radiation, etc.

Disposed in the upper portion of the instrument housing is a device 20 for lowering and raising the radiation detector through the house. This device may comprise any suitable clock-work mechanism or other device such as a small reversible electric motor connected through the cable 16 to an energizing or electrical switching device 22 at the surface. The device 22 may, for example, comprise a source of direct current and switch means for reversing the polarity of this current to the motor 20 so that the direction of rotation of the motor device can be controlled. Passing over a small pulley on the motor 20 is a cord or cable 24 from which is suspended a small housing 26 containing a scintillometer. As has been stated hereinabove, the scintillometer 26 comprises essentially a luminophor 28 which may be a crystal of sodium iodide, thallium activated, and a photomultiplier tube 30 serving to convert the photons from the crystal into electrical pulses. The output of the tube 30 passes through the flexible cord 32 to a preamplifier 34, the output from which is conducted upwardly over the cable 16 to other amplifiers indicated at 36, 38 and 40. The amplified output is in turn led to a suitable recorder 42 which is preferably of the moving tape or film strip type. As is well known the driving mechanism for the recorder strip may be synchronized with the movement of the cable reel 18 so that the indications on the log will correspond to the depths of the instrument 14 in the bore hole.

Shown disposed near the bottom of the instrument housing 14 is a radiation source 44 which may be a source of neutrons and gamma rays such as a mixture of radium and beryllium. Directly above the source 44 is a shield or absorber 46 preferably of a material such as lead for absorbing gamma rays which might otherwise pass directly upwardly from the source. Directly above the shield 46 is another cylindrical shield member 48 which like the shield 46 may be formed of a metal such as lead. The shield 48 is of such thickness that it will absorb gamma rays from the source 44 which are scattered in the surrounding formation and which would otherwise pass to the space within the shield. If desired, the upper ends of the shield 48 may be tapered outwardly as at 50.

In operation, the instrument 14 is preferably lowered to the bottom of the bore hole 10 with the scintillometer 26 in the position shown in the upper part of the housing. The instrument is then pulled upwardly a predetermined distance, such for example as 25 feet, along a section or increment of the hole and during this time gamma rays naturally emitted in the formations strike the luminophor 28 and cause scintillations which are converted into electrical pulses by the tube 30. These pulses are preamplified at 34 and passed upwardly over the cable 16 to the amplifier 36 and from there to the recorder 42 where a record is made on a moving tape, a portion of which is indicated at 52 and Figure 2. The log being made during this operation will correspond to the portion "A" shown in Figure 2. When the instrument 14 has traveled the distance of, say 25 feet, it will be stopped and the device 22 manipulated to energize the motor 20 to lower the scintillometer 26 to the position indicated by dotted lines at 26a. The instrument 14 will then be lowered over the same distance of 25 feet, and during this time the detector will respond to the gamma rays from the source 44 which are scattered in the surrounding formation and returned to the hole, one of these gamma rays being indicated at 54, and also to gamma rays induced in the formations due to neutron bombardment from the source 44. During this movement of the instrument 14, the output of the detector will be passed to amplifier 38 and then to the recorder 42 at which the combination scattered and induced gamma ray or "B" portion of the log will be made. The device 22 will then be again actuated causing the motor 20 to lower the detector to its bottom position shown by the dotted lines 26b at which time it will be surrounded at its sides by the shield 48. The instrument 14 will again be pulled upwardly over the 25 foot distance during which time the detector will respond to gamma rays such as the one indicated at 56 which are induced in the surrounding formations due to the bombardment of the neutrons such as the one indicated at 58. During this stage the output of the detector 26 will be amplified at 40 and recorded at 42 to produce the induced gamma ray or "C" portion of the log indicated in Figure 2. The device 22 will then be actuated to energize the motor 20 in the reverse direction to pull the scintillometer 26 upwardly to its original position and the entire instrument 14 can then be pulled upwardly through another distance, say 25 feet to make a natural gamma ray portion of the log of this second 25 foot increment. The operations previously described will again be carried out until the entire bore hole or at least that portion which is of interest has been logged.

As has been stated, the shield 48 will absorb those scattered gamma rays which might otherwise strike the detector when at its lowest position. The scattered gamma rays are of low energy, i. e. 1.5 m. e. v. or lower and these will be absorbed while the higher energy induced gamma rays 56 will be able to pass through the shield to strike the luminophor of the detector.

Although a crystal of sodium iodide, thallium activated, has been mentioned as a suitable luminophor for the scintillometer, it is to be understood that this is by way of example only, since there are many other materials which could be successfully used, for instance potassium iodide, thallium activated and calcium tungstate. These materials are available in crystal form and all those which have been mentioned have the advantage of not being responsive to nuetrons. If desired one of the iquid luminophors may be used, or a luminophor of the plastic type as disclosed in the U. S. Letters Patent No. 2,559,219 granted July 3, 1951, to C. G. Ludeman.

It is also believed to be well recognized that the cathode of the commercially available photomultiplier tubes may be damaged or destroyed when used at a temperature higher than 75° C. Since it is not uncommon that temperatures as high or higher than this are encountered in well bores, it is to be understood that a suitable cooling means may be used to maintain the temperature sensitive portion of the scintillometer at a value at which it will function satisfactorily. For example, the scintillometer may, if desired, be encased in a heat insulating container such as a Dewar flask in which may be inserted cracked ice or the like before the instrument is run into the bore hole.

It is also to be understood that Figure 2 of the drawing is merely a diagrammatic showing of a section of a log which may be obtained with this invention. As has been stated hereinabove it is preferred that the output of the detector in its lowest position be subtracted from the detector output in the position shown at 26a so that the effect of the induced gamma rays can be eliminated to produce a true scattered gamma ray log. This can be accomplished in any suitable manner such as by subtracting the induced gamma ray log from the combination scattered and induced gamma ray log after the logging operations have been completed. Several methods of subtracting one log from another are described in the U. S. Letters Patent No. 2,352,433 granted June 27, 1944, to Gerhard Herzog. The natural gamma ray log can likewise be subtracted from the other two logs in order to eliminate from those logs the effect of the gamma rays naturally emitted in the formations. Although the three logs have been described as being made in the sequence illustrated in Figure 2, it is to be understood that this is not essential. For instance, the scintillometer 26 can be lowered all the way to its lowest position so as to make the induced gamma ray low following the making of the natural gamma ray log.

Since the logging instrument has been described as being moved in one direction i. e. upwardly for making the natural gamma log and then downwardly for making the second or combination scattered and induced gamma ray log, these directions must be taken into consideration in studying the resulting logs. If desired, the second log can be reversed with respect to the second and third logs so that all three logs will appear as having been made while the instrument is moved in the same direction.

Again, although the invention has been described in connection with the logging of a well or a bore hole it is to be understood that the same principles will apply in other applications such for example, as in radioactivity surface surveying where the instrument may be pulled along or parallel ot the earth's surface.

Obviously many modifications and variations of the invention as hereinbefore set forth may be made without departing from the spirit and scope thereof and therefore only such limitations should be imposed as are indicated in the appended claims. By "secondary radiation" is meant any radiation originating in the source and scattered in the surrounding formations such as scattered gamma rays, or radiation induced in the formations by bombardment of the formations by direct radiation from the source.

I claim:

1. The method of making a natural gamma ray log and a secondary radiation log of earth formations traversed by a section of a bore hole, which comprises moving through said section a source of penetrative radiation and a gamma ray detector to measure gamma rays naturally emitted in said formations, said measurements being made at a fixed distance from said source and said distance being sufficiently great that the detector will be out of range of secondary radiation produced by said source, moving said detector to a new position closer to said source where it will be exposed to said secondary radiation, again moving said source and detector along the bore hole section to measure the secondary radiation from said formations, recording the first mentioned measurements to produce a natural gamma ray log of the bore hole section and recording the second mentioned measurements to produce a secondary radiation log of the bore hole section.

2. The method described in claim 1 in which the operations are repeated section by section through the bore hole.

3. The method described in claim 1 in which the measurements of naturally emitted gamma rays are subtracted from the measurements of secondary radiation to produce a true secondary radiation log.

4. The method of making a natural gamma ray log, a scattered gamma ray log and an induced gamma ray log of earth formations traversed by a bore hole which comprises moving through at least a section of the hole a neutron-gamma ray source and a gamma ray detector of the scintillometer type, so as to subject the detector to naturally emitted gamma rays while the detector is spaced far enough from said source to be out of range of radiation produced thereby, recording the response of said detector to produce a natural gamma ray log of said section, passing the detector to a new position where it will be subjected to gamma rays scattered from and induced by said source, repeating the movement of source and detector along said bore hole section and recording the detector response to produce a combination scattered and induced gamma ray log, passing the detector to another position to subject it to said induced gamma rays while shielding it from said scattered gamma rays, again moving the detector and source along said section while recording the detector output to produce an induced gamma ray log, subtracting the last mentioned log from said combination scattered and induced gamma ray log to produce a scattered gamma ray log, and repeating the foregoing operations along other sections of the bore hole.

5. The method of examining earth formations traversed by a bore hole which comprises moving through a section of said hole a source of neutrons and gamma rays and a gamma ray detector of the scintillometer type while subjecting said detector to the gamma rays naturally emitted from said formations, the detector being spaced from said source sufficiently for it to be out of range of gamma rays scattered from and induced by bombardment from said source, stopping said movement, passing said detector to a second position closer to said source where it will be in the range of gamma rays scattered from the source in said formations and gamma rays induced in said formations by bombardment by neutrons from said source, again moving said source and detector along the same section of the bore hole, again stopping said movement, passing the detector to a third position still closer to the source and subjecting it to said induced gamma rays while shielding it from said scattered gamma rays and again moving it along the same section of the bore hole, recording the output of said detector during each movement along said bore hole section, so as to make consecutively a natural gamma ray log, a scattered plus an induced gamma ray log and an induced gamma ray log, subtracting said induced gamma ray log from the scattered plus induced gamma ray log to obtain a scattered gamma ray log, and repeating these operations through other sections of said bore hole.

6. A radioactivity bore hole logging assembly comprising an elongated housing adapted to be passed through said bore hole, a source of neutrons and gamma rays in one end of said housing, a detector of penetrative radiation disposed near the other end of the housing and spaced far enough from said source in that position to be out of range of gamma rays scattered in the material around said housing and induced gamma rays produced by bombardment by said source of the formations surrounding the bore hole, means for moving said detector to a second position closer to said source where it will be within the range of said scattered and induced gamma rays, means for shielding the detector from said scattered gamma rays when in said second position, means for moving said housing through the bore hole while the detector is in each of said two positions, and means for recording the output from said detector while in each of said positions.

7. A radioactivity bore hole logging assembly comprising an elongated instrument housing adapted to be passed through said bore hole, a source of neutrons and gamma rays in one end of said housing, a scintillometer radiation detector disposed near the other end of the housing and spaced far enough from said source in that position to be out of range of gamma rays scattered and induced by bombardment by said source of the formations surrounding the bore hole, means for moving said detector to a second position closer to said source where it will be exposed to gamma rays scattered and induced in said formations by bombardment from said source, means for moving said detector to a third position near said source where it will be exposed to said induced gamma rays, means for shielding said detector from said scattered gamma rays while in said third position, means for moving said housing through the bore hole while the detector is in each of said three positions and means for recording the output from said detector in each of said positions.

8. An apparatus as described in claim 7 in which the detector moving means is designed to return the detector from the third position to the first mentioned position so that the bore hole can be logged section by section without withdrawing the instrument housing from the hole.

9. An apparatus as described in claim 7 in which the detector moving means comprises a reversible electric motor in the instrument housing, means at the surface for energizing said motor in one or the other direction, a pulley driven by said motor and a flexible cable connected to the scintillometer and a passing over said pulley whereby on energization of the motor the detector will be raised or lowered within the instrument housing.

10. An apparatus as described in claim 7 in which said shielding means comprises a cylindrical member of a gamma ray absorptive material, said member being disposed substantially coaxially of said instrument housing slightly above said source so that when the scintillometer is lowered to its lowest position it will enter and be surrounded by the shielding material which will absorb gamma rays from said source scattered in the surrounding formations.

11. The method of making an induced gamma ray log and a scattered gamma ray log of earth formations traversed by a section of a bore hole which comprises moving through said section a source of neutrons and gamma rays and a gamma ray detector, said detector being positioned with respect to said source at a distance such that the detector will be exposed both to gamma rays induced in the formation by the bombardment thereof with neutrons from said source and to gamma rays from said source which are scattered in said formation and returned to the bore hole, recording the detector output to produce a combination induced and scattered gamma ray log of said section, moving said detector to a new position at a different distance from said source, shielding the detector in said new position from the said scattered gamma rays while still exposing the detector to said induced gamma rays, again moving the detector and source along said section while recording the detector output to produce an induced gamma ray log and subtracting the last-mentioned log from said combination induced and scattered gamma ray log to produce a scattered gamma ray log.

12. The method described in claim 11 in which the operations are repeated section by section through the bore hole.

13. The method described in claim 1 in which the operations described therein are conducted along the earth's surface rather than in a bore hole.

References Cited in the file of this patent

UNITED STATES PATENTS

| Number | Name | Date |
|---|---|---|
| 2,220,509 | Brons | Nov. 5, 1940 |
| 2,303,688 | Fearon | Dec. 1, 1942 |
| 2,508,772 | Pontecorvo | May 23, 1950 |